US007386001B1

(12) United States Patent
Kim et al.

(10) Patent No.: US 7,386,001 B1
(45) Date of Patent: Jun. 10, 2008

(54) APPARATUS AND METHOD FOR CHANNEL CODING AND MULTIPLEXING IN CDMA COMMUNICATION SYSTEM

(75) Inventors: Beong-Jo Kim, Songnam-shi (KR); Se-Hyoung Kim, Seoul (KR); Min-Goo Kim, Suwon-shi (KR); Soon-Jae Choi, Songnam-shi (KR); Young-Hwan Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 1414 days.

(21) Appl. No.: 09/603,062

(22) Filed: Jun. 26, 2000

(30) Foreign Application Priority Data

Jun. 25, 1999 (KR) ............................... 1999-26221
Jul. 7, 1999 (KR) ............................... 1999-27163

(51) Int. Cl.
*H04Q 7/00* (2006.01)

(52) U.S. Cl. ........................ 370/442; 370/441; 370/535

(58) Field of Classification Search ................ 370/342, 370/441, 535, 537, 538, 542, 543, 320, 335, 370/540, 477, 468, 479, 280, 336, 337, 347, 370/442, 528, 355; 711/157; 704/230; 375/240.26
See application file for complete search history.

(56) References Cited

U.S. PATENT DOCUMENTS

| 4,679,191 A | * | 7/1987 | Nelson et al. ............... 370/355 |
| 4,987,570 A | * | 1/1991 | Almond et al. ............. 370/540 |
| 5,729,526 A | * | 3/1998 | Yoshida ....................... 370/206 |
| 5,831,978 A | | 11/1998 | Willars et al. ............... 370/335 |
| 6,269,126 B1 | * | 7/2001 | Toskala et al. ............. 375/265 |
| 6,381,234 B2 | * | 4/2002 | Sakoda et al. .............. 370/336 |
| 6,397,367 B1 | * | 5/2002 | Park et al. ................... 714/786 |
| 6,493,666 B2 | * | 12/2002 | Wiese, Jr. ................... 704/230 |
| 6,501,748 B1 | * | 12/2002 | Belaiche ...................... 370/342 |
| 6,567,392 B1 | * | 5/2003 | Rubin et al. ................. 370/342 |
| 6,768,728 B1 | * | 7/2004 | Kim et al. ................... 370/342 |
| 6,795,506 B1 | * | 9/2004 | Zhang et al. .......... 375/240.26 |
| 6,868,075 B1 | * | 3/2005 | Narvinger et al. .......... 370/335 |

FOREIGN PATENT DOCUMENTS

| EP | 1045521 A2 | 4/2000 |
| EP | 1156616 A2 | 4/2006 |
| WO | WO 97/00568 | 1/1997 |
| WO | WO 99/16264 | 4/1999 |

(Continued)

OTHER PUBLICATIONS

European Search Report dated May 3, 2002 issued in EP Appln. No. 00940975.6.

(Continued)

*Primary Examiner*—John Pezzlo
(74) *Attorney, Agent, or Firm*—The Farrell Law Firm, P.C.

(57) ABSTRACT

A channel coding and multiplexing apparatus and method in a CDMA communication system is disclosed. In the channel coding and multiplexing apparatus, each of a number of radio frame matchers (equal in number or greater than the number of transport channels) has a radio frame segmenter and segments each of transport channel frames that may have different transmission time intervals to radio frames. A multiplexer multiplexes the radio frames to form a serial data frame.

21 Claims, 8 Drawing Sheets

FOREIGN PATENT DOCUMENTS

WO      WO 00/62465      10/2000

OTHER PUBLICATIONS

Alfred Baier et al., "Design Study for a CDMA-Based Third-Generation Mobile Radio System", IEEE Journal on Selected Areas in Communications, vol. 12, No. 4, May 1994.

Japanese Office Action dated Jan. 6, 2004 issued in a counterpart application, namely, Appln. No. 2001-506182.

TS 25.212: "3rd Generation Partnership Project (3GPP); Technical Specification Group (TSG) Radio Access Network (RAN); Working Group I (WG1); Multiplexing and Channel Coding (FDD)", Apr. 1999.

Mitsubishi Electric: "Discussion on Segmentation of Block Between Radio Frame for TrCH with Transmission Time Interval Longer than 10ms", RAN WG1 Meeting #4, Apr. 19-20, 1999.

TSG-RAN Working Group 1 (Radio) Meeting #3, S1.12 (V1.1.0): Multiplexing and Channel Coding (FDD), Mar. 22-26, 1999.

European Search report dated Nov. 7, 2003 issued in a counterpart application, namely, Appln. No. EP03016891.

Gang Wu et al.; "An Intergrated Transmission Protocol for Broadband Mobile Multimedia Communication Systems"; Mar. 1997; pp. 1346-1350.

Chih-I et al.; Performance of Multi-Code CDMA Wireless Personal Communications Network: 1995 IEEE; pp. 907-911.

Technical Specification 3GPP TS 25.212 Version 1.0.0; 4-1999; pgs. 38.

Technical Specification 3GPP TS 25.212 Version 2.0.0; 6-1999; pgs. 38.

Vol. 3 Specifications of Air-Interference for 3G Mobile System Version 1.0; Dec. 1997; pgs. 173.

TSGR1 #4(99)349; "Discussion on Segmentation of Block Between Radio Frame for TrCH with Transmission Time Interval Longer Than 10ms"; Apr. 1999; pgs. 6.

Notice of Opposition to a European Patent; European Patent No. 1,357,674; May 2007; 26 pgs.

Notice of Opposition to a European Patent; European Patent No. 1,357,675; May 2007; 27 pgs.

Yukihiko Okumura; WG1 Proposal relating to radio frame segmentation; 3GPP_TSG_RAN_WG1.

"Adaptive Use of Parallel Serial Links"; IBM Technical Disclosure Bulletin; vol. 39 No Jun. 1996; pgs. 2.

* cited by examiner

APPARATUS AND METHOD FOR CHANNEL CODING AND MULTIPLEXING IN CDMA COMMUNICATION SYSTEM

PRIORITY

This application claims priority to two applications entitled "Apparatus and Method for Channel Coding and Multiplexing in CDMA Communication System" filed in the Korean Industrial Property Office on Jun. 25, 1999 and assigned Serial No. 99-26221 and "Apparatus and Method for Channel Coding and Multiplexing in Channel in CDMA Communication System" filed in the Korean Industrial Property Office on Jul. 7, 1999 and assigned Serial No. 99-27163, the contents of both of which are hereby incorporated by reference.

BACKGROUND OF THE INVENTION

1. Field of the Invention

The present invention relates generally to a channel communication apparatus and method in a mobile communication system, and in particular, to a channel coding and multiplexing apparatus and method in which multi-transport channel frames are converted to multi-physical channel frames.

2. Description of the Related Art

A conventional CDMA (Code Division Multiple Access) mobile communication system primarily provides a voice service. However, the future CDMA mobile communication system will support the IMT-2000 standard, which can provide a high-speed data service as well as the voice service. More specifically, the IMT-2000 standard can provide a high-quality voice service, a moving picture service, an Internet browsing service, etc. This future CDMA communication system will be comprised of a downlink for transmitting data from a base station to a mobile station and an uplink for transmitting data from the mobile state to the base station.

It will thus be desirable for the future CDMA communication system to provide various communication services such as simultaneous voice and data communications. However, details are yet to be specified for the simultaneous implementation of voice and data communications.

SUMMARY OF THE INVENTION

It is, therefore, an object of the present invention to provide a channel coding and multiplexing apparatus and method in which a transport channel frame data is segmented into plurality of radio frames in a transmitting device of a CDMA communication system.

It is also an object of the present invention to provide a channel coding and multiplexing apparatus and method in which each of the data frames of a plurality of transport channels is segmented into radio frames and the segmented radio frames are multiplexed to form a serial data frame at every radio frame transmission time interval (TTI) in a transmitting device of a CDMA communication system.

It is another object of the present invention to provide a channel coding and multiplexing apparatus and method in which each of the data frames of a plurality of transport channels is segmented into radio frames, the segmented radio frames are multiplexed to form a serial data frame at every radio frame TTI, and the serial data frame is segmented into a plurality of physical channel frames to transmit the physical channel frames on a plurality of physical channels in a transmitting device of a CDMA communication system.

It is a further object of the present invention to provide a channel coding and multiplexing apparatus and method in which a transport channel frame data is added with filler bits and segmented into radio frames in a channel transmitting device of a CDMA communication system.

It is still another object of the present invention to provide a channel coding and multiplexing apparatus and method in which received physical radio frames are demultiplexed to form plurality of radio frames and the radio frames are desegmented to form a transport channel frame in a channel receiving device of a CDMA communication system.

It is yet another object of the present invention to provide a channel coding and multiplexing apparatus and method in which data frames received via multi-code physical channels are desegmented to form a serial data frame and demultiplexed to form radio frames of each transport channels in a receiving device of a CDMA communication system.

To achieve the above objects, a channel coding and multiplexing apparatus and method in a CDMA communication system has as many radio frame matchers as transport channels and a multiplexer. Each radio frame matcher has a radio frame segmenter and segments a transport channel frame that may have a different transmission time interval from the transmission time intervals of other transport channel frames in other transport channels to form radio frames and the multiplexer multiplexes the radio frames to a serial data frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The present invention defines in detail radio frame segmentation, multiplexing, and physical channel segmentation for channel coding & multiplexing in a channel communication device of a CDMA communication system. That is, radio frame segmentation, multiplexing of radio frames, and segmentation of the multiplexed radio frames into physical channel frames, that are not provided by the 3GPP Technical Specification for Multiplexing and Channel Coding, TS 25.212 version 1.0.0 1990. 05. 05, will be defined fully enough to deal with bit-basis operations. The 3GPP Technical Specification for Multiplexing Channel Coding, TS 25.212 version 1.0.0 1999. 05. 05, published by 3GPP Organizational Partners is hereby incorporated by reference.

Prior to description of the present invention, terms as used herein will be defined. "Transport channel frame" or "input data frame": a data frame applied to the input of a radio frame matcher from a channel coder; "Radio frame": a data frame formed by segmenting the input transport channel frame, where the size of the radio frame is a function of the transmission time interval (TTI) of the input transport channel frame and the radio frame TTI as explained below. A transport channel frame may be transmitted at a different data rate for a different TTI.

The following description is conducted with the appreciation that particular details like a radio frame TTI and the insertion position of a filler bit are given by way of example for comprehensive understanding of the present invention. Therefore, it is clear to those skilled in the art that the present invention can be readily implemented without the details or by their modifications.

A description will now be made of the structures and operations of 3GPP uplink and downlink channel coding and multiplexing apparatuses including first interleavers through second interleavers according to an embodiment of the present invention.

Figure 1:
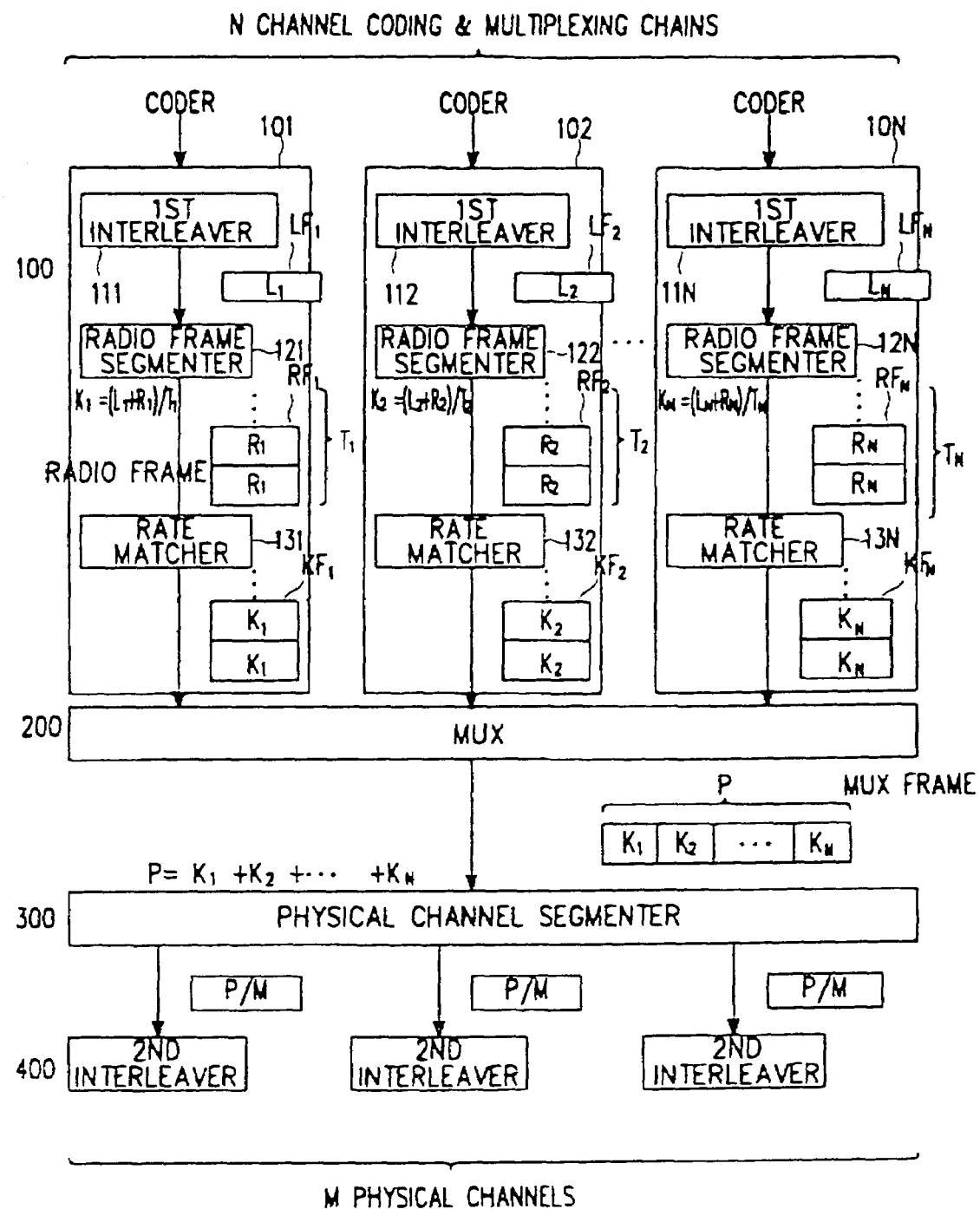
FIG. 1 is a block diagram of an embodiment of an uplink channel transmitting device according to the present invention.
Figure 2:
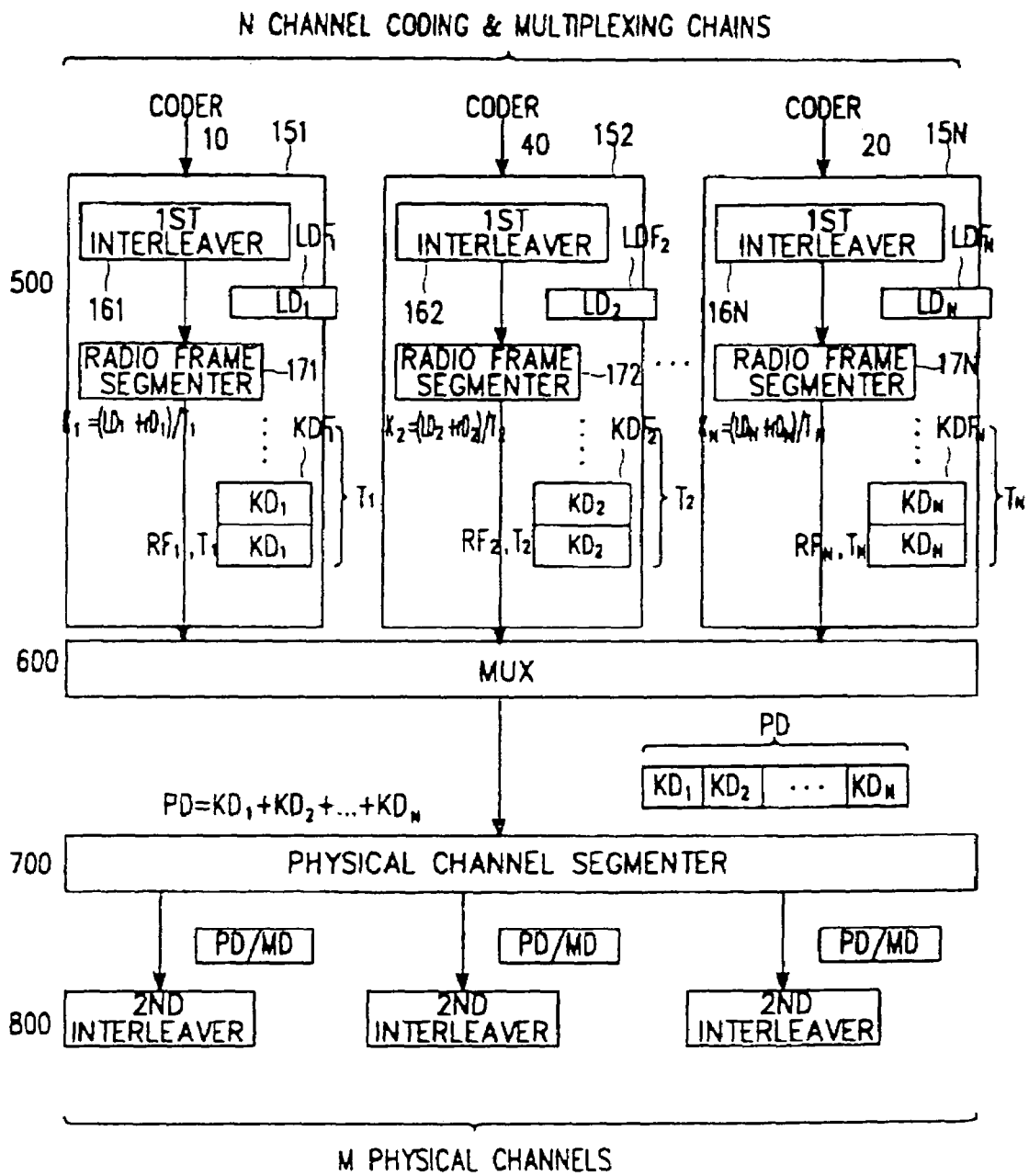
FIG. 2 is a block diagram of an embodiment of a downlink channel transmitting device according to the present invention.
Figure 3:
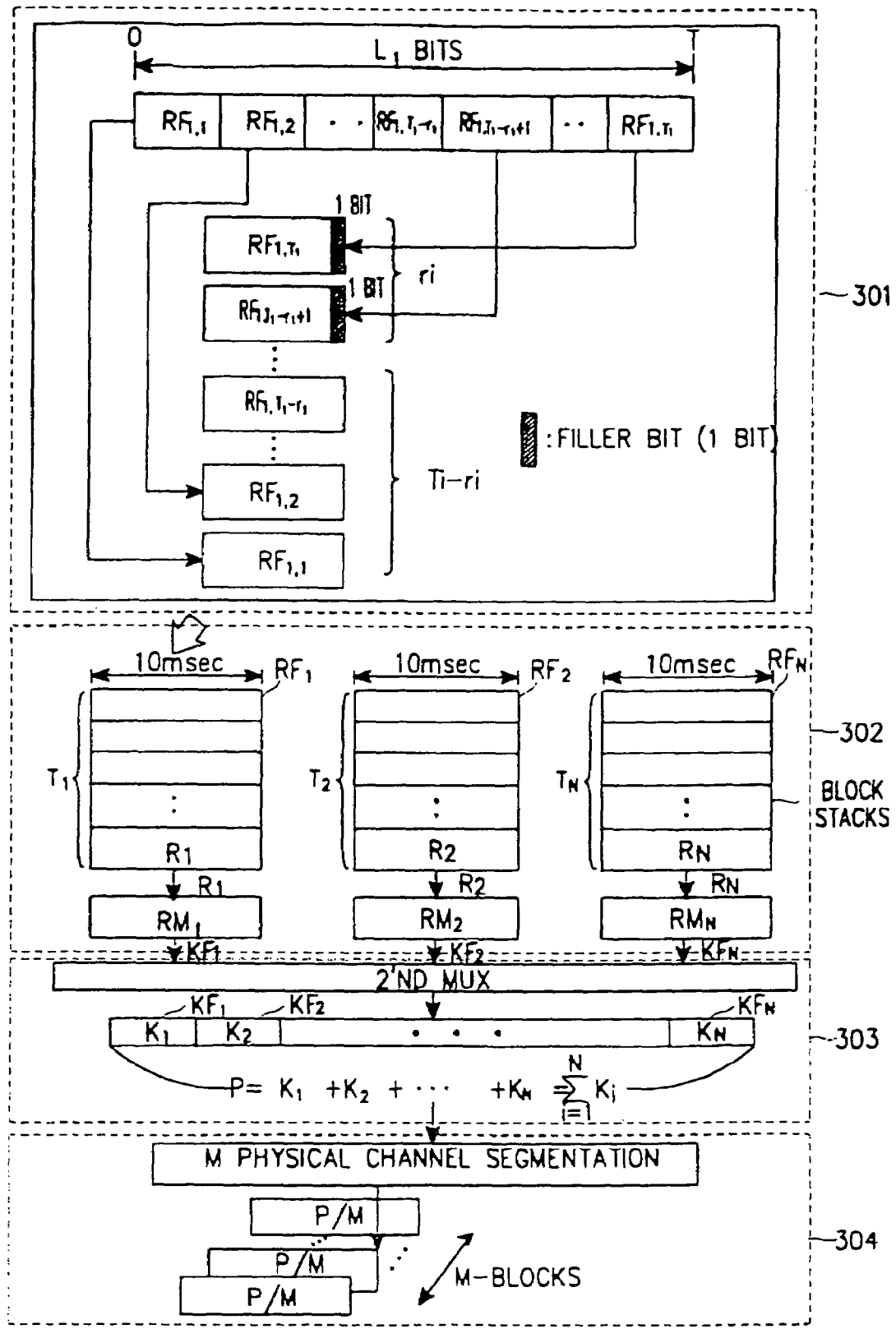
FIG. 3 is a view illustrating the operation of the channel transmitting devices shown in FIGS. 1 and 2.

FIGS. 1 and 2 are block diagrams of uplink and downlink channel transmitting devices, respectively, according to an embodiment of the present invention. Receiving devices for receiving information from the channel transmitting devices have the reverse configurations of their counterparts. FIG. 3 is a view referred to for describing the operations of the channel transmitting devices shown in FIGS. 1 and 2.

In accordance with the embodiment of the present invention, data frames received via at least two transport channels may have different TTIs and different data rates. Radio frame matchers 101, 102, . . . 10N (i.e., "101 to 10N") receive the data frames of the corresponding transport channels, segment the received data frames into data of a size, which is a function of the transport channel frame TTI and the radio frame TTIs (i.e., radio frames), and sequentially output the segmented radio frames (The "N" is used throughout in the reference number notation to indicate an indefinite number of respective components). Each of the radio frame matchers 101 to 10N includes an interleaver for compensating for fading, a radio frame segmenter for segmenting an interleaved transport channel frame into radio frames, and a rate matcher for controlling the data rate of the radio frames by puncturing/repeating certain parts of the radio frames. In the case where the bit number of a transport channel frame is not a multiple of a radio frame length, a corresponding radio frame matcher inserts a filler bit into the transport channel frame, which is performed in its radio frame segmenter by way of example in the embodiment of the present invention.

A multiplexer 200 sequentially multiplexes radio frames sequentially received from the radio frame matchers 101 to 10N to a serial data stream.

In case of the multicode transmission, a physical channel segmenter 300 segments the serial data stream received from the multiplexer 200 into data frames as many as the number of physical channels using at least two codes and transfers the data frames to the corresponding physical channels, so that the serial data frame can be transmitted on the physical channels.

In case of a single code transmission, the physical channel segmenter 300 does not need to segment the serial data stream, but instead transmits the serial data stream on a physical channel.

Referring to FIGS. 1 and 3, reference numeral 100 denotes the entire block of channel coding & multiplexing chains having the radio frame matchers 101 to 10N for receiving N encoded data that may have different qualities of service (QoS) in parallel. In other words, data streams applied to the radio frame matchers 101 to 10N from MAC (Medium Access Control) and higher layers (transport block/transport block set) may have different QoS. Specifically, transport channel frames may have different data rates and different TTIs and each radio frame matcher receives frame data from a corresponding channel coder. The same coder outputs frame data of the same QoS during each service. However, during another service, the QoS of the same coder may change to another QoS. Therefore, data of different QoS may be applied to the radio frame matchers 101 to 10N, but each radio frame matcher receives frame data of the same QoS during each individual service.

Each radio frame matcher receives encoded frame data having a different data frame size and a frame transmission period according to its QoS from a corresponding channel coder. QoS is determined by voice, data, and images. Accordingly, the data rate and TTI of frame data depend on its QoS. In the embodiment of the present invention, it is assumed that data frames have TTIs of 10, 20, 40, or 80 msec. According to its service type, input coded data may have a different data rate and a different TTI. In other words, frames of each channel have a unique TTI and data rate. In the case where data of one channel is to be transmitted, encoded data generated from one channel coder is processed and in the case where data of two channels is to be transmitted, encoded data generated from two corresponding channel coders are processed.

Each of first interleavers 111 to 11N primarily interleaves a transport channel frame received from a corresponding channel coder. Here, a channel frame received from each channel coder may have a different TTI and a different data rate.

As shown in FIG. 1, radio frames are referred as RF and are indexed as follows: $RF_{i,j}$ where i=transport channel index and j=radio frame index for a given transport channel and $RF_i$ refers to all of the radio frames in the $i^{th}$ transport channel (e.g., $RF_{1,2}$ means a second radio frame in a first transport channel and $RF_1$ refers to all of the radio frames in the first transport channel). Radio frame segmenters 121 to 12N segment data frames $LF_1$ to $LF_N$ received from the first interleavers 111 to 11N, respectively, into radio frames $RF_1$ to $RF_N$, respectively, as indicated by reference numeral 301 in FIG. 3 and in FIG. 1, and output the radio frames $RF_1$ to $RF_N$ sequentially in the order of segmentation. In embodiments of the present invention, $T_i$ refers to the number of radio frames in a transport channel i where i=transport channel index (e.g., $T_1$ is equal to the number of radio frames in the first transport channel).

Here, the transport channel frames $LF_1$ to $LF_N$ may have different TTIs and different data rates according to their channels. The radio frame TTI is assumed to be 10 ms in the embodiment of the present invention. Thus, each of the radio frames $RF_1$ to $RF_N$ contains as much data as 10 ms duration frame of the input transport channel frame. In this case, a radio frame segmenter, if it receives a transport channel frame of a 80-ms TTI, segments the 80-ms data frame into eight radio frames sequentially, and sequentially outputs the radio frames. A radio frame matcher, which receives a transport channel frame of a 40-ms TTI, segments the 40-ms data frame into four radio frames sequentially. In the same manner, a radio frame matcher, which receives a transport channel frame of a 20-ms TTI, segments the 20-ms data frame into two radio frames sequentially. A 10 ms-data frame is equal in duration to the radio frame TTI and thus output without segmentation.

A transport channel frame length in bits may not be an integer multiple of the radio frame length in bits. In this case, it is preferable to insert a filler bit into the transport channel frame to make the transport channel frame length in bits as long as a multiple of the radio frame length in bits. That is, if $L_i/T_i$ ($L_i$: the length of an input transport channel frame in the $i^{th}$ transport channel and in certain embodiments of the present invention, $T_i$=TTI for $i^{th}$ transport channel/10 msec) is not an integer, a filler bit is inserted. The filler bit is pre-processed prior to radio frame segmentation in order to maintain a radio frame length constant for a transmission period. Transmission of the whole transport channel frames is easily controlled by keeping a radio frame length constant within the TTI of the transport channel frames. When a transport channel frame has the maximum TTI of 80 msec, seven filler bits can be used at maximum. The decrease of transmission efficiency that arises from an increase in the whole data frame rate caused by addition of these filler bits is negligibly small. The radio frame segmenters 121 to 12N sequentially segment input transport channel frames into 10-msec radio frames $RF_1$ to $RF_N$ as indicated by reference numeral 302 in FIG. 3. The rate matchers 131 to 13N adjust the data rates of the radio frames $RF_1$ to $RF_N$ received from the radio frame segmenter 121 to 12N, respectively, and output data frames $KF_1$ to $KF_N$, respectively. $K_i$ refers to the length of the respective $KF_i$ frames.

The above radio frame matchers 101 to 10N receive corresponding transport channel frames in parallel, check the sizes of the transport channel frames, segment the transport channel frames into radio frames, and output the radio frames in parallel. The multiplexer 200 multiplexes the data frames $KF_1$ to $KF_N$ received from the rate matchers 131 to 13N to a serial data stream of size P as indicated by reference numeral 303 in FIG. 3. Here, the multiplexer 200 can sequentially multiplex the data frames $KF_1$ to $KF_N$. In this case, the size of the multiplexed frame $P=K_1+K_2+\ldots+K_N$. Therefore, the multiplexer 200 first determines the number N of transport channels, receives radio frames in parallel from the radio frame matchers 101 to 10N, and sequentially multiplexes the radio frames to a serial data frame. That is, the multiplexer 200 outputs a serial data frame indicated by 303 in FIG. 3.

A physical channel segmenter 300 segments the multiplexed frame of size P received from the multiplexer 200 into M physical channel frames as indicated by 304 in FIG. 3 (M is the number of available physical channels) and feeds the physical channel frames to second interleavers 401 to 40N. Here, each physical channel frame is as long as P/M. The physical channels may use multiple codes. Hence, the physical channel segmenter 300 sets the number M of available physical channels, segments the multiplexed serial data frame into M physical channel frames, and assigns them to the corresponding physical channels. The multiplexed serial data frame can be segmented into one or more physical channel radio frames of the same data rate. Alternatively, the multiplexed serial data frame can be segmented into one or more physical channel frames of different data rates.

An uplink channel receiving device for receiving radio frames from the uplink channel transmitting device shown in FIG. 1 performs the operation of the uplink channel transmitting device in the reverse order. The uplink channel receiving device will be described later with reference to FIG. 4.

The operation of each component shown in FIG. 1 is illustrated in FIG. 3 in detail.

Referring to FIG. 3, reference numeral 301 denotes segmentation of transport channel frames received in parallel from the first interleavers 111 to 11N into radio frames which will be transmitted from the radio frame segmenters 121 to 12N. If $L_i/T_i$ is not an integer, a corresponding radio frame segmenter inserts a filler bit to make $L_i$ be a multiple of $T_i$. As shown in FIG. 3, filler bits are sequentially inserted into radio frames, preferably beginning with the last radio frame.

The reference numeral 301 in FIG. 3 illustrates the procedure for adding filler bits to the radio frames. The procedure is explained in detail in the subsequent sections. The embodiment of the present invention is described in the context with the case that one filler bit 0 or 1 is inserted into one radio frame. Reference numeral 302 indicates rate matching of the radio frames according to their data rates. Reference numeral 303 indicates multiplexing of N radio frames of size $K_i$ (i=1, 2, ..., N) after rate matching to one multiplexed frame of size P and transmission of the multiplexed frame to the physical channel segmenter 300. Reference numeral 304 indicates segmentation of the multiplexed frame into M physical channel frames and parallel assignment of the M physical channel frames to physical channels.

FIG. 2 is a block diagram of a downlink channel transmitting device for downlink channel coding & multiplexing, illustrating radio frame matchers 151 to 15N through second interleavers 800.

The downlink channel transmitting device operates in the same manner as the uplink channel transmitting device shown in FIGS. 1 and 3 except that the outputs of radio frame segmenters 171 to 17N are applied to the input of the multiplexer 600. Rate matchers are not shown in the drawing because they are disposed before the first interleavers in the downlink channel transmitting device of FIG. 2.

A downlink channel receiving device is the same in operation as the uplink channel receiving device except that it does not perform rate dematching.

A description will be given primarily of the radio frame segmenters, multiplexers, and physical channel segmenters in the channel transmitting devices constituted as shown in FIGS. 1 and 2 according to the embodiment of the present invention. For better understanding of the present invention, the description will be confined to the uplink channel transmitting device. Therefore, the radio frame segmenter are labeled with 121 to 12N, the multiplexer with 200, and the physical channel segmenter with 300.

Radio Frame Segmentation Using Filler Bit

Uplink and downlink radio frame segmenters operate in the same manner. The radio frame segmenters 121 to 12N segment input transport channel frames into 10-msec radio frame blocks and sequentially output the radio frames. During this operation, filler bits may or may not be inserted into a transport channel frame according to the bit number of the transport channel frame. In the embodiment of the present invention, insertion of filler bits is implemented in the radio frame segmenters 121 to 12N if filler bits are inserted. One filler bit is inserted into one radio frame and filler bit insertion begins with the last radio frame. A description of inserting a filler bit into a transport channel frame and then segmenting the transport channel frame into radio frames in the radio frame segmenters 121 to 12N referring to FIG. 5 will precede that of segmenting a transport channel frame into radio frames without inserting filler bits in the radio frame segmenters 121 to 12N referring to FIG. 6.

In case the ratio ($L_i/T_i$) of the size of a transport channel frame applied to the input of a radio frame segmenter to the radio frame TTI is not an integer, the number $r_i$ of filler bits is calculated in the following way in order to make $L_i/T_i$ an integer. Since $T_i$ ranges from 0 to 8, $r_i$ ranges from 0 to 7. ($L_i+r_i$)/$T_i$ achieved with the use of filler bits is defined as $KD_i$ and $R_i$, respectively for the downlink and the uplink.

$r_i=T_i-(L_i \bmod T_i)$, here $r_i=\{0, 1, 2, 3, 4, 5, 6, 7\}$ downlink: $KD_i=(LD_i+rD_i)/TD_i$ $LD_i$, $rD_i$ and $TD_i$ are $L_i$, $r_i$ and $T_i$ for the downlink, respectively uplink: $R_i=(L_i+r_i)/T_i$ If the number $r_i$ of filler bits is not 0, a filler bit is added to the last bit position of each of corresponding radio frames from a $(T_i-r_i+1)^{th}$ radio frame in order to maintain a frame length constant, i.e., $KD_i$ or $R_i$. 0 or 1 is arbitrarily selected as a filler bit. The filler bit has little to do with performance and serves as a reserved bit that can be selected by a system user. It can be contemplated that the filler bit is designated as a discontinuous transmission (DTX) bit so that a transmitter does not transmit the filler bit after channel coding & multiplexing. The radio frame blocks that are modified to have a constant radio frame length in the above manner are fed to the multiplexer 200. Then, the operation of the radio frame segmenters on a bit basis will be described in detail.

As for bits prior to radio frame segmentation in an $i^{th}$ radio frame matcher 10$i$, it is assumed that the number $r_i$ of filler bits has already been calculated and $1 \leq t \leq T_i$ (t indicates a radio frame index). t=1 for the first radio frame, t=2 for the second radio frame, and t=$T_i$ for the last radio frame. Each radio frame has the same size, ($L_i+r_i$)/$T_i$. Then, the output bits of a first interleaver 111 of the $i^{th}$ radio frame matcher 10$i$ is taken to be $b_{i,1}$, $b_{i,2}$, . . . , $b_{i,Li}$ and the output bits of the radio frame segmenter 12$i$ is taken to be $c_{i,1}$, $c_{i,2}$, . . . , $c_{i,[(Li+ri)/Ti]}$ in 10-msec frame units for $T_i$=TTI (msec) of an $i^{th}$ transport channel/10 (msec)$\in\{1, 2, 4, 8\}$. Then output bits of the radio frame segmenter for the first 10 msec: t=1

$c_{i,j}=b_{i,j}$, j=1, 2, . . . , ($L_i+r_i$)/$T_i$ output bits of the radio frame segmenter for the second 10 msec: t=2

$c_{i,j}=b_{i,(j+(Li+ri)/Ti))}$, j=1, 2, . . . , ($L_i+r_i$)/$T_i$ output bits of the radio frame segmenter for the $(T_i-r_i)^{th}$ 10 msec: t=$(T_i-r_i)$ $c_{i,j}=b_{i,(j+(Ti-ri-1)(Li+ri)/Ti))}$, j=1, 2, . . . , ($L_i+r_i$)/$T_i$ output bits of the radio frame segmenter for the $(T_i-r_i+1)^{th}$ 10 msec: t=$(T_i-r_i+1)$ $c_{i,j}=b_{i,(j+(Ti-ri)(Li+ri)/Ti))}$, j=1, 2, . . . , ($L_i+r_i-1$)/$T_i$ $c_{i,j}$=filler_bit(0,1), j=($L_i+r_i$)/$T_i$

:

:

output bits of the radio frame segmenter for the $T_i^{th}$ 10 msec: t=$T_i$ $c_{i,j}=b_{i,(j+Ti-ri)(Li+ri)/Ti))}$, j=1, 2, . . . , ($L_i+r_i-1$)/$T_i$ $c_{i,j}$=filler_bit(0,1), j=($L_i+r_i$)/$T_i$ The radio frame segmenter 12$i$ is included in a transmitting device and its counterpart is a radio frame desegmenter in a receiving device. Radio frame desegmentation is equivalent to the reverse operation of radio frame segmentation in that 10-msec blocks received for a transmission period are sequentially arranged and assembled into one frame.

Figure 5:
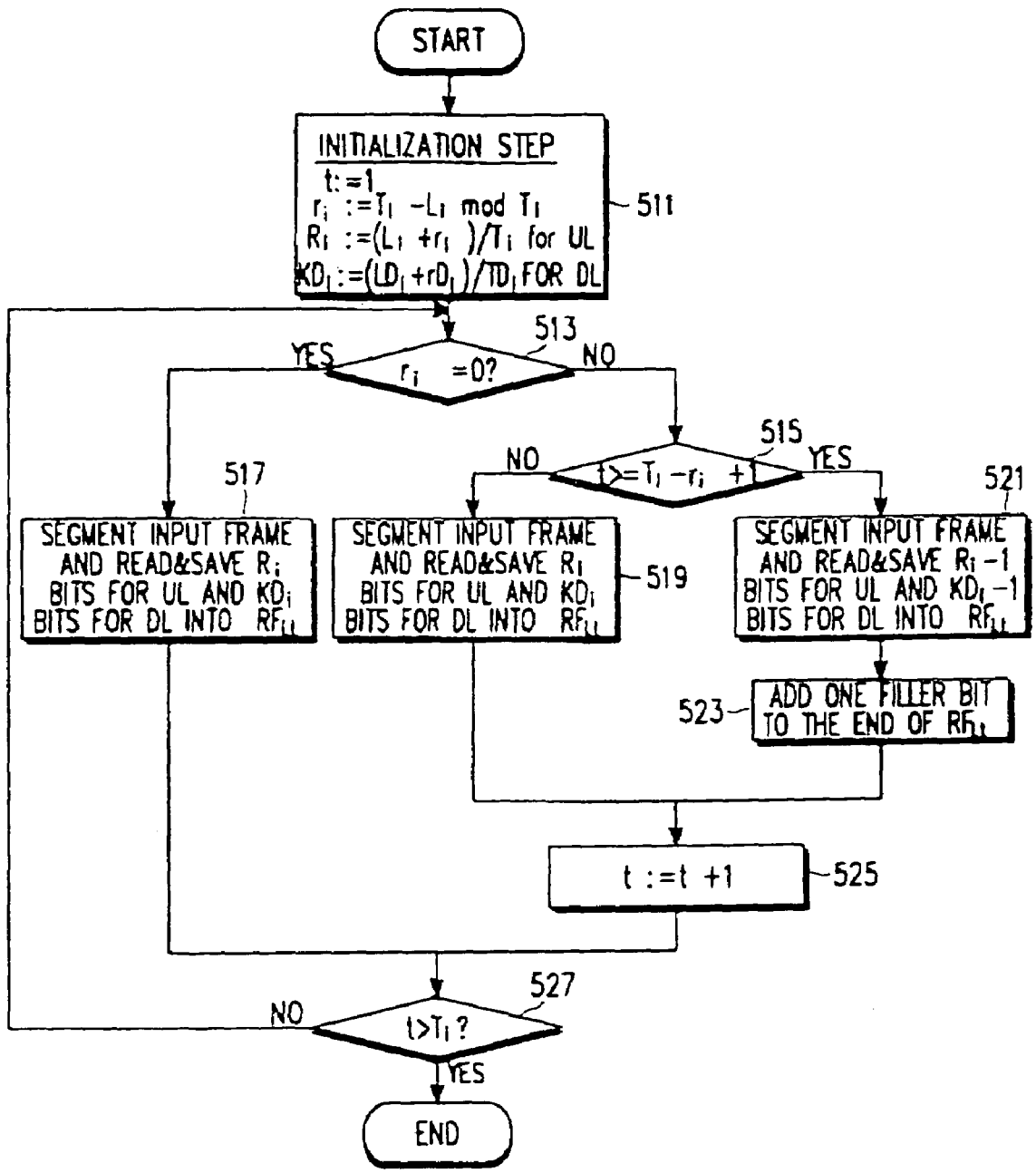
FIG. 5 is a flowchart illustrating a radio frame generation procedure using filler bits according to the present invention.

FIG. 5 illustrates a radio frame generation process using filler bits in the above-described manner. Variables as used below will first be defined.

t: frame time index (1, 2, . . . , $T_i$);

$RF_{i,t}$: a $t^{th}$ 10 msec radio frame in an $i^{th}$ radio frame matcher; and $L_i$: input frame size from the $i^{th}$ radio frame matcher.

Referring to FIG. 5, the radio frame segmenter performs an initialization process in step 511:

t: =1/*frame time index initialization*/

$r_i$: =$T_i$-$L_i$ mod $T_i$/* number of filler bits*/

$R_i$: =($L_i+r_i$)/$T_i$ for UL (uplink)/*radio frame size for uplink*/

$KD_i$: =($LD_i+rD_i$)/$TD_i$ for DL (downlink)/* radio frame size for downlink*/

In step 513, the radio frame segmenter checks whether the number $r_i$ of filler bits is 0. If the number $r_i$ of filler bits is 0, the radio frame segmenter reads data of a radio frame size from an input frame and stores it in step 517. On the other hand, if the number $r_i$ of filler bits is not 0, the radio frame segmenter checks whether a frame index t is (Ti−$r_i$+1) in step 515, that is, a current radio frame is to be added with a filler bit. In the case of a radio frame that will not be added with a filler bit, the radio frame segmenter reads data of a radio frame size from an input frame and stores it in step 519 and proceeds to step 525. In the case of a radio frame that will be added with a filler bit, the radio frame segmenter reads data one bit smaller than a radio frame size from the input frame and stores it in step 521. The radio frame segmenter inserts the last bit position of the stored radio frame in step 523, increases the frame index t by 1 in step 525, and checks whether the updated frame index t is larger than the segment number $T_i$ corresponding to the radio frame TTI in step 527. If the frame index t is smaller than the segment number $T_i$ corresponding to the radio frame TTI, the radio frame segmenter returns to step 513. If the frame index t is larger than the segment number $T_i$ corresponding to the radio frame TTI, the radio frame generation procedure ends. Radio frames generated in this manner are sequentially fed to the second multiplexer 200.

Radio Frame Segmentation Without Inserting Filler Bits

A radio frame segmenter that does not use filler bits may be used instead of the above described radio frame segmenter. Since $T_i$ ranges from 0 to 8, $r_i$ ranges from 0 to 7. ($L_i+r_i$)/$T_i$ for the downlink and the uplink are defined as $KD_i$ and $R_i$, respectively.

$r_i=T_i-(L_i \bmod T_i)$, here $r_i\{(0, 1, 2, 3, 4, 5, 6, 7\}$ downlink: $KD_i=(LD_i+rD_i)/TD_i$ uplink: $R_i=(L_i+r_i)/T_i$ The bit-basis operation of the radio frame segmenter that does not use filler bits will be described in detail.

As for bits prior to radio frame segmentation in the $i^{th}$ radio frame matcher 10i, it is assumed that the number $r_i$ of filler bits has already been calculated and $1 \leq t \leq T_i$ (t indicates a radio frame index). t=1 for the first radio frame, t=2 for the second radio frame, and t=$T_i$ for the last radio frame.

Then, let the output bits of the first interleaver 11i in the $i^{th}$ radio frame matcher 10i be $b_{i,1}$, $b_{i,2}$, ..., $b_{i,Li}$ and let the output bits of the radio frame segmenter 12i be $c_{i,1}$, $c_{i,2}$, ..., $c_{i,(Li+ri)/Ti}$ in a 10-msec frame unit for $T_i$=TTI (msec) of the $i^{th}$ transport channel/10 (msec)∈{1, 2, 4, 8}. Then output bits of the radio frame segmenter for the first 10 msec: t=1

$c_{i,j} = b_{i,j}$, j=1, 2, ..., $(L_i+r_i)/T_i$ output bits of the radio frame segmenter for the second 10 msec: t=2

$c_{i,j} = b_{i,(j+(Li+ri)/Ti))}$, j=1, 2, ..., $(L_i+r_i)/T_i$ output bits of the radio frame segmenter for the $(T_i-r_i)^{th}$ 10 msec: t=$(T_i-r_i)$ $c_{i,j} = b_{i,(j+(Ti-ri-1)(Li+ri)/Ti))}$, j=1, 2, ..., $(L_i+r_i)/T_i$ output bits of the radio frame segmenter for the $(T_i-r_i+1)^{th}$ 10 msec: t=$(T_i-r_i+1)$ $c_{i,j} = b_{i,(j+(Ti-ri)(Li+ri)/Ti))}$, j=1, 2, ..., $(L_i+r_i)/T_i$

:

:

output bits of the radio frame segmenter for the $T_i^{th}$ 10 msec: t=$T_i$ $c_{i,j} = b_{i,(j+Ti-ri)(Li+ri)/Ti))}$, j=1, 2, ..., $(L_i+r_i)/T_i$ If $r_i$ is not 0, the size of the first to $(T_i-r_i)^{th}$ radio frames is $R_i$ and the size of the $(T_i-r_i+1)^{th}$ to the last radio frames is $(R_i-1)$. For downlink, if $rD_i$ is not 0, the size of the first to $(TD_i-rD_i)^{th}$ radio frames is $KD_i$ and the size of the $(TD^i-rD_i+1)^{th}$ to the last radio frames is $(KD_i-1)$. Radio frame blocks of sizes varied with time are fed to the multiplexer. Due to the variable radio frame size, a frame size in the multiplexer may vary at every 10 msec intervals and the physical channel segmenter may also operate differently at every 10 msec intervals, making control of frame size complicated. Accordingly, it is preferable to employ a radio frame segmenter which inserts filler bits.

The radio frame segmenter 12i is included in a transmitting device and its counterpart is a radio frame desegmenter in a receiving device. Radio frame desegmentation is equivalent to the reverse operation of radio frame segmentation in that 10-msec blocks received for a transmission period are sequentially arranged and assembled into one frame.

Figure 6:
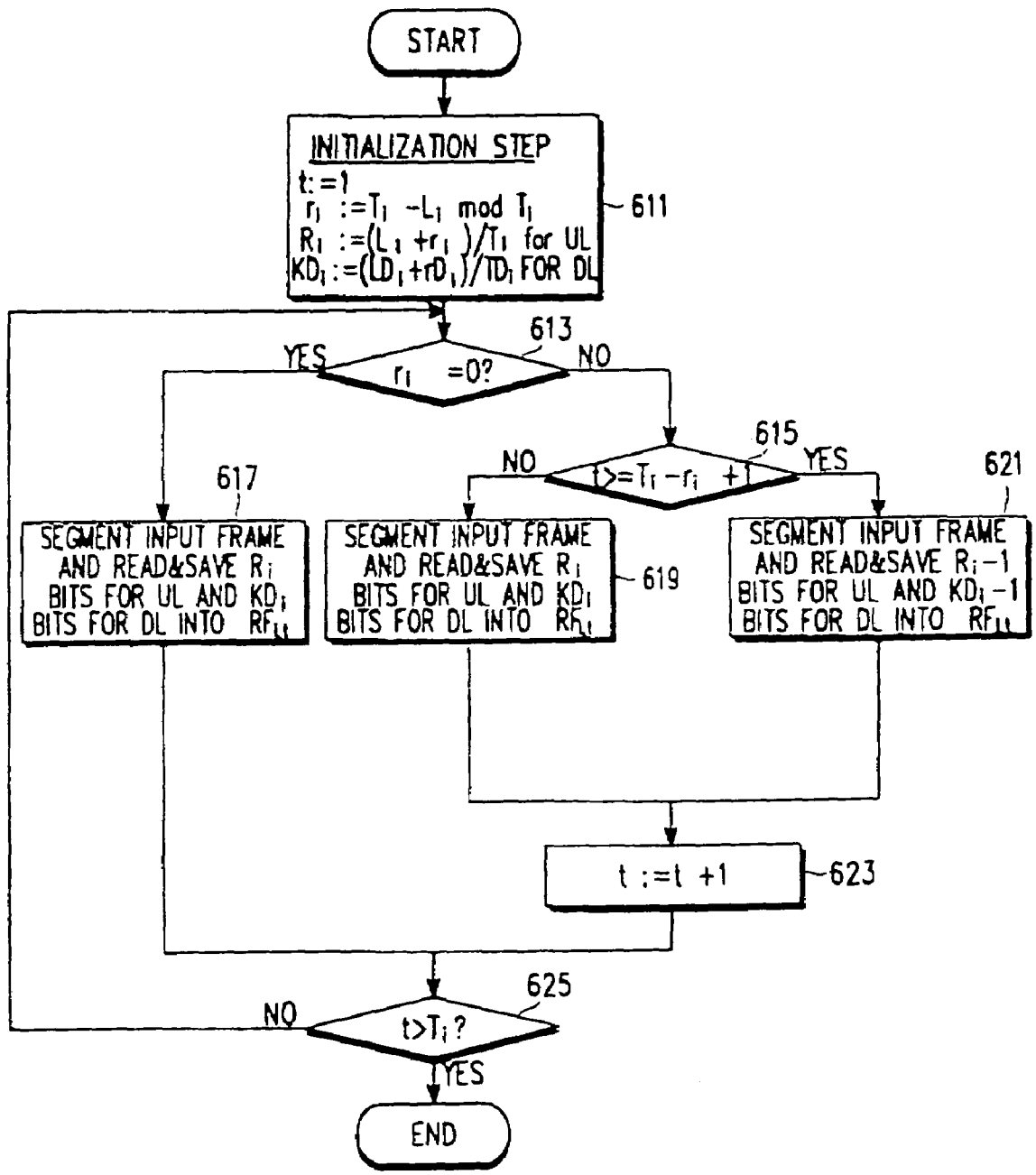
FIG. 6 is a flowchart illustrating a radio frame generation procedure without using filler bits according to the present invention.

FIG. 6 illustrates a radio frame generation process with inserting filler bits in the above-described manner. Variables as used hereinbelow will first be defined.

t: frame time index (1, 2, ..., $T_i$);

$RF_{i,t}$: a $t^{th}$ 10 msec radio frame in an $i^{th}$ channel coding & multiplexing chain; and $L_i$: input frame size from the $i^{th}$ channel coding & multiplexing chain.

Referring to FIG. 6, the radio frame segmenter performs an initialization process in step 611:

t: =1 /*frame time index initialization*/

$r_i$: =$T_i$−L mod $T_i$ /* number of filler bits*/

$R_i$: =$(L_i+r_i)/T_i$ for UL (uplink)/*radio frame size for uplink*/

$KD_i$: =$(LD_i+rD_i)/TD_i$ for DL (downlink)/* radio frame size for downlink*/

In step 613, the radio frame segmenter checks whether the number $r_i$ of filler bits is 0. If the number $r_i$ of filler bits is 0, the radio frame segmenter reads data of a radio frame size from an input frame and stores it in step 617. On the other hand, if the number $r_i$ of filler bits is not 0, the radio frame segmenter checks whether a frame index t is (Ti−$r_i$+1) in step 615. If the frame index t is smaller than $(T_i-r_i+1)$, the radio frame segmenter reads data of a radio frame size from an input frame and stores it in step 619 and proceeds to step 623. If the frame index t is equal to or greater than $(T_i-r_i+1)$, the radio frame segmenter reads data one bit smaller than a radio frame size from the input frame and stores it in step 621. The radio frame segmenter increases the frame index t by 1 in step 623, and checks whether the updated frame index t is larger than the segment number $T_i$ corresponding to the radio frame TTI in step 625. If the frame index t is smaller than the segment number $T_i$ corresponding to the radio frame TTI, the radio frame segmenter returns to step 613. If the frame index t is greater than the segment number $T_i$ corresponding to the radio frame TTI, the radio frame generation procedure ends. Radio frames generated in this manner are sequentially fed to the multiplexer 200.

Multiplexing

The multiplexer 200 for the uplink will be described. Bits as described below are applied to the input of the multiplexer 200.

output bits of rate matcher #1: $c_{1,1}$, $c_{1,2}$, ..., $c_{1,K1}$ output bits of rate matcher #2: $c_{2,1}$, $c_{2,2}$, ..., $c_{2,K2}$ output bits of rate matcher #3: $c_{3,1}$, $c_{3,2}$, ..., $c_{3,K3}$

...

output bits of rate matcher #N: $c_{N,1}$, $c_{N,2}$, ..., $c_{N,KN}$

The output bits $d_1$, $d_2$, ..., $d_p$ of the multiplexer 200 are when j=1, 2, 3, ..., P(P=$K_1+K_2+\ldots+K_N$), $d_j=c_{i,j}$ J=1, 2, ..., $K_1$ $d_j=c_{2,(j-K1)}$ j=$K_1$+1, $K_1$+2, ..., $K_1+K_2$ $d_j=c_{3,(j-(K1+K2))}$ j=$(K_1+K_2)$+1, $(K_1+K_2)$+2, ..., $(K_1+K_2)+K_3$

...

$d_j=c_{N,(j-(K1+K2+\ldots+KN-1))}$ j=$(K_1+K_2+\ldots+K_{N-1})$+1, $(K_1+K_2+\ldots+K_{N-1})$+2, ..., $(K_1+K_2+\ldots+K_{N-1})+K_N$ Then, the operation of the multiplexer 200 for the downlink will be described below.

Bits as described below are applied to the input of the multiplexer 200.

output bits of rate matcher #1: $c_{1,1}$, $c_{1,2}$, ..., $c_{1,K1}$ output bits of rate matcher #2: $c_{2,1}$, $c_{2,2}$, ..., $c_{2,K2}$ output bits of rate matcher #3: $c_{3,1}$, $c_{3,2}$, ..., $c_{3,K3}$

...

output bits of rate matcher #N: $c_{N,1}$, $c_{N,2}$, ..., $c_{N,KN}$

The output bits $d_1$, $d_2$, ..., $d_p$ of the multiplexer 200 are when j=1, 2, 3, ..., P(P=$K_1+K_2+\ldots+K_N$), $d_j=c_{i,j}$ J=1, 2, ..., $K_1$ $d_j=c_{2,(j-K1)}$ j=$K_1$+1, $K_1$+2, ..., $K_1+K_2$ $d_j=c_{3,(j-(K1+K2))}$ j=$(K_1+K_2)+1, (K_1+K_2)+2, \ldots, (K_1+K_2)+K_3$
...

$d_j=c_{N,(j-(K1+K2+\ldots+KN-1))}$ j=$(K_1+K_2+\ldots+K_{N-1})+1, (K_1+K_2+\ldots+K_{N-1})+2, \ldots, (K_1+K_2+\ldots+K_{N-1})+K_N$ The multiplexer 200 is included in a transmitting device and its counterpart is a demultiplexer in a receiving device. The demultiplexer reversely performs the operation of the multiplexer 200, that is, segments an input frame into N blocks and feeds the N blocks to corresponding radio frame dematchers.

Figure 7:
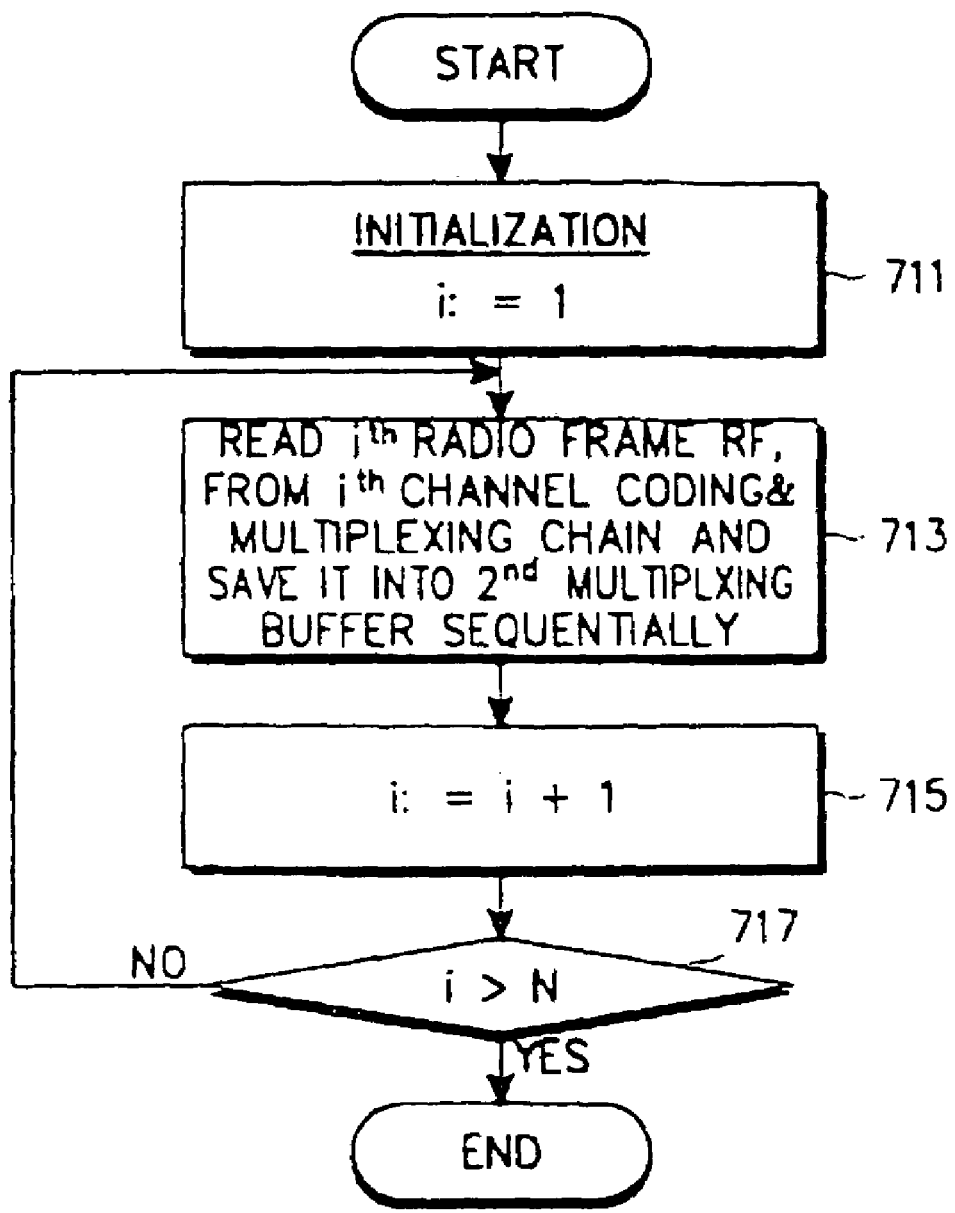
FIG. 7 is a flowchart illustrating an embodiment of a radio frame multiplexing procedure according to the present invention.

FIG. 7 is a flowchart illustrating a radio frame multiplexing procedure in the multiplexer 200. Prior to description of the procedure shown in FIG. 7, terms as used below are defined.

N: total number of radio frame matchers;

i: radio frame matcher index (1, 2, . . . , N); and

RFi: a 10 msec radio frame in an $i^{th}$ radio frame matcher.

The multiplexer 200 sets the radio frame matcher index i to an initial value 1 in step 711 and stores a radio frame received from the $i^{th}$ radio frame matcher in a multiplexing buffer in step 713. In step 715, the multiplexer 200 increases the radio frame matcher index i by 1. Then, the multiplexer 200 checks whether the increased index i is greater than the total number N of radio frame matchers in step 717. If i is equal to or smaller than N, the multiplexer 200 returns to step 713. If i is greater than N, the multiplexer 200 ends the multiplexing procedure. As described above, the multiplexer 200 sequentially stores radio frames received from the radio frame matchers in the multiplexing buffer and generates a multiplexed frame of size P that is a serial data frame.

Physical Channel Segmentation

The physical channel frame segmenter 300 operates in the same manner for the uplink and the downlink.

Let the bits of a serial data frame output from the multiplexer be $d_1, d_2, \ldots, d_p$, and the number of physical channels be M. Then, output bits of the physical channel frame segmenter for physical channel #1:

$e_{1,j}=d_j$ j=1, 2, . . . , P/M output bits of the physical channel frame segmenter for physical channel #2:

$e_{2,j}=d_{(j+P/M)}$ j=1, 2, . . . , P/M output bits of the physical channel frame segmenter for physical channel #M:

$e_{M,j}=d_{(j+(M-1)P/M)}$ j=1, 2, . . . , P/M

The above physical channel segmentation scheme in the physical channel segmenter is advantageous in that the best use of the effects of the second interleavers are made. Therefore, the probability of bit errors after decoding at a receiver, caused by burst error on a fading channel, can be minimized. For a data rate of 1/3 for a general channel coder, three symbols represent one information bit. Another physical channel segmentation scheme with M=3 and P=30 can be further contemplated as shown below:

Bits before physical channel segmentation:
   0 1 2 3 4 5 6 7 8 9 10 . . . 29

Bits after physical channel segmentation:
   Physical channel #1: 0 3 6 9 12 . . . 27
   Physical channel #2: 1 4 7 10 13 . . . 28
   Physical channel #3: 2 5 8 11 14 . . . 29

Since the same second interleaver is used in this three-physical channel segmentation, three input symbols are always consecutive after second interleaving. Accordingly, the three consecutive symbols are highly likely to experience errors at fading at a specific time point.

Meanwhile, a segment having consecutive bits of the same number is assigned to one physical channel in the present invention and thus Bits before physical channel segmentation:
   0 1 2 3 4 5 6 7 8 9 10 . . . 29

Bits after physical channel segmentation:
   Physical channel #1: 0 1 2 3 . . . 9
   Physical channel #2: 10 11 12 13 . . . 29
   Physical channel #3: 20 21 22 23 . . . 29

After second interleaving, three physical channels have different time in the same bit position, thereby decreasing the probability of concurrent errors in three symbols representative of one information bit due to fading. Therefore, a receiver may have a lower bit error rate (BER) in the present invention than the above-described physical channel segmentation.

The physical channel frame segmenter is included in a transmitting device and its counterpart is a physical channel desegmenter in a receiving device. The physical channel desegmenter performs the reverse operation of the physical channel segmenter, that is, sequentially arranges M physical channel frames and assembles them into one frame.

Figure 8:
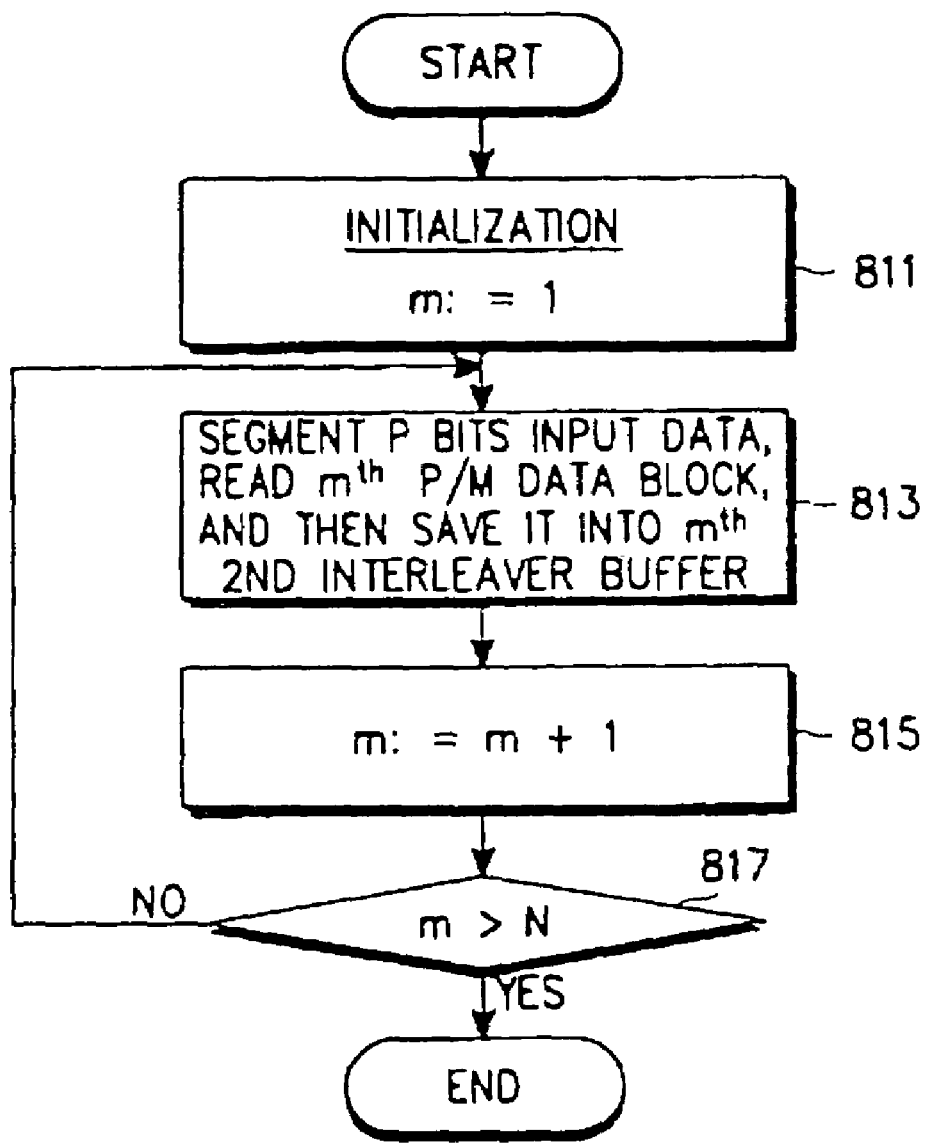
FIG. 8 is a flowchart illustrating an embodiment of a physical channel frame generation procedure according to the present invention.

FIG. 8 is a flowchart illustrating a physical channel frame generating procedure in the physical channel segmenter. Terms as used below will first be defined.

m: physical channel index (1, 2, . . . , M);

M: total number of physical channels; and

P: index data block size in bits.

Referring to FIG. 8, the physical channel segmenter 300 sets the physical channel index m to an initial value 1 in step 811 and reads a data block of size P/M from input data of size P and stores it in an $m^{th}$ physical channel buffer in step 813. Then, the physical channel segmenter 300 increases the physical channel index m by 1 in step 815 and checks whether the increased physical channel index m is greater than the total number M of the physical channels in step 817. If m is equal to or smaller than M, the physical channel segmenter 300 returns to step 813. On the contrary, if m is greater than M, the physical channel segmentation ends.

Implementation of Receiving device

Figure 4:
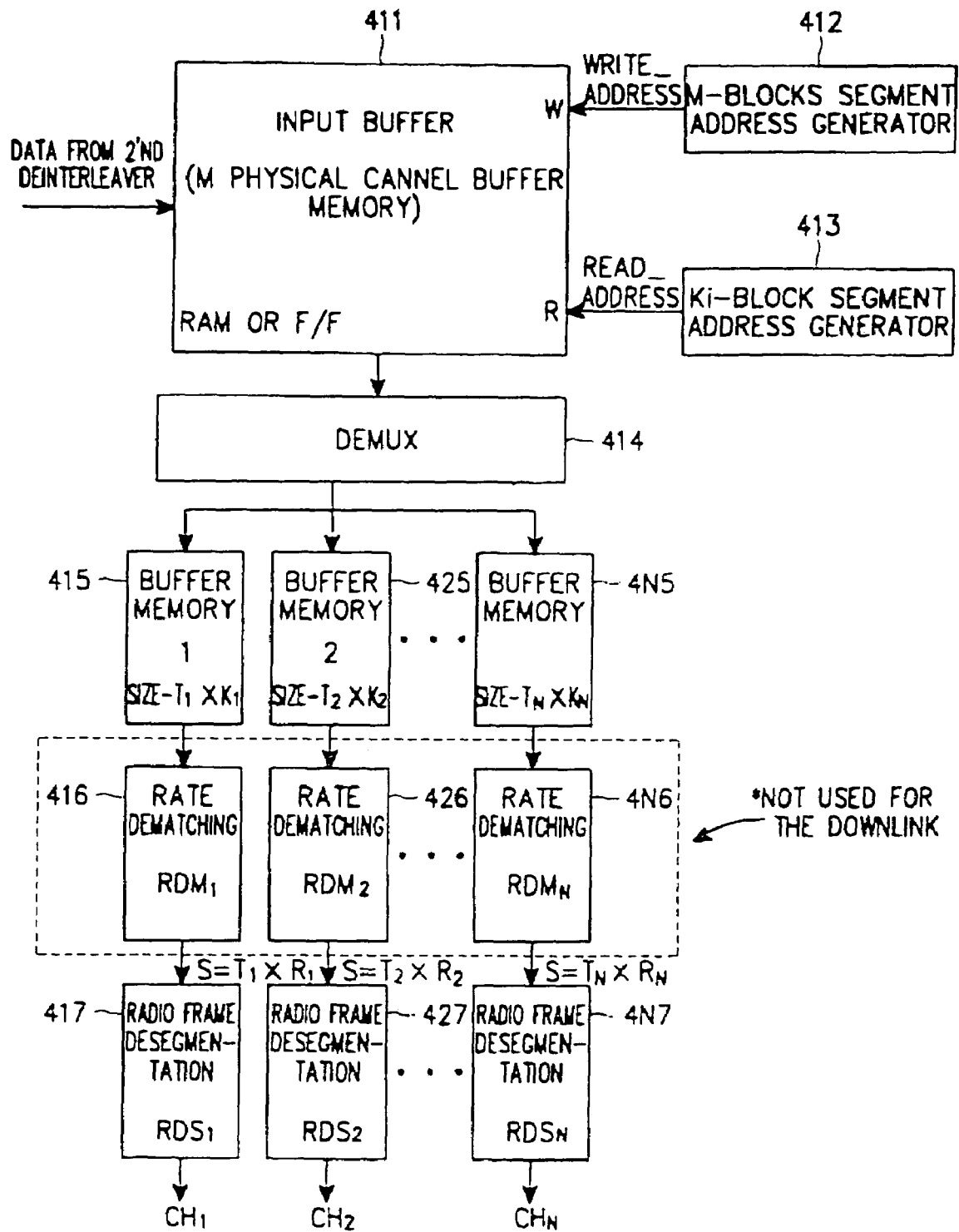
FIG. 4 is a block diagram of an embodiment of a channel receiving device according to the present invention.

FIG. 4 is a block diagram of a channel receiving device having the counterparts of the radio frame segmenter, the multiplexer, and the physical channel segmenter as described above.

Referring to FIG. 4, a physical channel memory 411 stores second-interleaved symbols. A first address generator 412 generates a write address for every M bits of the second-interleaved symbols at which the M bits will be stored in the physical channel memory 411. A second address generator 413 generates a read address for sequentially reading the symbols from the physical channel memory 411 when the symbols are completely stored in the physical channel memory 411. A demultiplexer 414 distributes symbols received from the physical channel memory 411 to N buffers 415 to 4N5. The buffers 415 to 4N5 feed the stored symbols to corresponding radio desegmenters 417 to 4N7 without rate dematching if the symbols are for the downlink and to rate dematchers 416 to 4N6 if the symbols are for the uplink. The rate dematchers 416 to 4N6 perform zero symbol insertion and symbol combination, in the reverse order of rate matching. The radio frame desegmenters 417 to 4N7 assemble the symbols received from the rate dematchers 416 to 4N6 to data of corresponding transport channel TTIs and transmit the desegmented data to a channel decoder for channel decoding.

For a write operation, the first address generator 412 operates to write every M bits in the physical channel memory 411, that is a buffer memory for storing symbols received after second deinterleaving. Therefore, the physical channel memory 411 receives a total of P symbols from the second interleaver by operating P/M times. When there is no data on each channel coding & multiplexing channel, the total number of received symbols is smaller than P. Hence, a maximum buffer size is P. Upon completion of the write operation, the second address generator 413 generates read addresses and symbols are read from the physical channel memory 411 in the address generation order. The read operation is performed in $(L_i+r_i)/T_i$ $(=R_i)$ units. By reading N frames of size $R_i$, a total of P symbols are transmitted to the N buffers 415 to 4N5 through the demultiplexer 414. Each buffer has a size of $T_i \times R_i$ (i=1, 2, 3, . . . , N). In this course, the demultiplexer 414 serves to distinguish N symbols. The classified symbols are transmitted directly to the radio frame desegmenters 417 to 4N7 without rate dematching if they are the downlink ones, whereas the symbols are subjected to rate dematching if they are the uplink ones. That is, the rate dematchers 416 to 4N6 implements zero symbol insertion and symbol combination, which is the reverse operation of rate matching. Then, the radio frame desegmenters 417 to 4N7 transmit desegmented symbols to corresponding channel decoders for channel decoding. As noted from the above description, the operation of the receiving device is basically the reverse of that of the transmitting device.

In accordance with the present invention as described above, radio frame segmentation, multiplexing, and physical channel segmentation for multiplexing & channel coding are defined in detail. Frames of various types generated from channel coders are converted to radio frames, multiplexed, and converted to physical frames. The physical frames are then assigned to physical channels. Therefore, uplink and downlink transmitting devices in a CDMA communication system can implement various communication services such as transmission of voice, data, and images.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A channel coding and multiplexing apparatus for a CDMA communication system, in which data frames that have different transmission time intervals (TTIs) are received in parallel via a plurality of transport channels and multiplexed to a serial data frame, the apparatus comprising:
   a number of radio frame matchers, the number of radio frame matchers being at least equal to the number of the transport channels, each radio frame matcher having a radio frame segmenter for receiving the data frames and segmenting the data frames into radio frames; and
   a multiplexer for multiplexing the radio frames to the serial data frame,
   wherein each radio frame segmenter determines the bit number of a radio frame according to the size of the data frames received by the corresponding frame matcher and the TTI of a radio frame and divides the data frames by the bit number of the radio frame.

2. The channel coding and multiplexing apparatus of claim 1, wherein each radio frame matcher further includes an interleaver for interleaving the data frames received by the corresponding frame matcher and applying the interleaved data to a corresponding radio frame segmenter.

3. The channel coding and multiplexing apparatus of claim 1, wherein each radio frame matcher further includes a rate matcher for adjusting the data rate of a radio frame received from a radio frame segmenter by one of puncturing and repeating parts of the radio frame to match the data rate of the radio frame to that of a physical channel frame.

4. The channel coding and multiplexing apparatus of claim 1, wherein the radio frame matchers are connected between channel coders and the multiplexer in an uplink frame transmitting device, and each of the radio frame matchers of the uplink channel transmitting device comprises:
   an interleaver for interleaving the data frames received by the corresponding frame matcher;
   a radio frame segmenter for determining the bit number of a radio frame according to the size of the data frames received by the corresponding frame matcher and a radio frame TTI and dividing the data frames by a variable, said variable being a function of the radio frame TTI; and
   a rate matcher for adjusting the data rate of a radio frame received from the radio frame segmenter by one of puncturing and repeating parts of the radio frame to match the data rate of the radio frame to that of a physical channel frame.

5. The channel coding and multiplexing apparatus of claim 1, wherein the radio frame matchers are connected between channel coders and a multiplexer in a downlink channel transmitting device, and each of the radio frame matchers of the downlink channel transmitting device comprises:
   an interleaver for interleaving the data frames received by the corresponding frame matcher;
   a radio frame segmenter for determining the bit number of a radio frame according to the size of the data frames received by the corresponding frame matcher and a radio frame TTI and dividing the data frame by a variable, said variable being a function of the radio frame TTI.

6. A channel coding and multiplexing apparatus for a CDMA communication system, in which data frames that have one or more transmission time intervals (TTIs) are received in parallel via a plurality of transport channels and converted to data frames of multi-code physical channels, the apparatus comprising:
   a number of radio frame matchers, each radio frame matcher having a radio frame segmenter for segmenting the data frames into radio frames;
   a multiplexer for multiplexing the radio frames into a serial data frame; and
   a physical channel segmenter adapted to segment the serial data frame by the number of the physical channels and outputting the segmented physical channel frames to corresponding physical channels,
   wherein the segmented physical channel frames for a physical channel #1 are output as $e_{1,j}=d_j$, the segmented physical channel frames for a physical channel #2 are output as $e_{2,j}=d_{(j+P/M)}$ and the segmented physical channel frames for a physical channel #M are output as $e_{M,j}=d_{(j+(M-1)P/M)}$, and wherein the bits of the serial data frame output from the multiplexer are $d_1, d_2, \ldots, d_p$, the number of physical channels is M, the size of the serial data frame output from the multiplexer is P and $j=1, 2, \ldots, P/M$.

7. A channel coding and multiplexing apparatus for a CDMA communication system, in which data frames that have one or more transmission time intervals (TTIs) are received in parallel via a plurality of transport channels and multiplexed to a serial data frame, the apparatus comprising:
   a number of radio frame matchers, each of the radio frame matchers adapted to determine a number of filler bits and inserting the determined number of filler bits into the data frames, and each of the radio frame matchers having a radio frame segmenter for segmenting the data frames having the inserted number of filler bits into radio frames; and
   a multiplexer for multiplexing the radio frames into the serial data frame.

8. The channel coding and multiplexing apparatus of claim 7, wherein each radio frame segmenter determines the bit number of the radio frames according to the size of the corresponding data frame, a radio frame TTI, and the number of filler bits, and divides the corresponding data frame by the bit number of the radio frames.

9. The channel coding and multiplexing apparatus of claim 7, wherein each radio frame matcher further includes an interleaver for interleaving the data frames received by the corresponding frame matcher and applying the interleaved data frames to a corresponding radio frame segmenter.

10. The channel coding and multiplexing apparatus of claim 7, wherein each radio frame matcher further includes a rate matcher for adjusting the data rate of a radio frame received from a radio frame segmenter by one of puncturing and repeating parts of the radio frame to match the data rate of the radio frame to that of a physical channel frame.

11. A channel coding and multiplexing apparatus for a CDMA communication system, in which data frames that have one or more transmission time intervals (TTIs) are received in parallel via a plurality of transport channels and converted to data frames of multi-code physical channels, the apparatus comprising:
   a number of radio frame matchers, each of the radio frame matchers determining a number of filler bits and inserting the determined number of filler bits into the data frames and each of the radio frame matchers having a radio frame segmenter for segmenting the data frames having the inserted number of filler bits into radio frames;
   a multiplexer for multiplexing the radio frames into a serial data frame; and
   a physical channel segmenter for segmenting the multiplexed serial data frame by the number of the physical channels and outputting the segmented physical channel frames to corresponding physical channels.

12. A channel coding and multiplexing method for a CDMA communication system in which data frames that have one or more transmission time intervals (TTIs) are received in parallel via a plurality of transport channels and multiplexed into a serial data frame, the method comprising:
   receiving data frames;
   determining a number of filler bits;
   inserting the number of filler bits into the data frames;
   segmenting the data frames including the filler bits into radio frames in a number of radio frame matchers; and
   multiplexing the radio frames into the serial data frame.

13. The channel coding and multiplexing method of claim 12, further comprising:
   segmenting the serial data frame by the number of the physical channels; and
   assigning the segmented physical channel frames to the corresponding physical channels.

14. A channel coding and multiplexing apparatus for a CDMA communication system, in which data frames that have one or more transmission time intervals (TTIs) are received in parallel via a plurality of transport channels and multiplexed into a serial data frame, the apparatus comprising:
   a plurality of radio frame matchers, each of the radio frame matchers adapted to determine a number of filler bits and to insert the determined number of the filler bits into the data frames and, each of the radio frame matchers comprising a radio frame segmenter for segmenting the data frames having the inserted number of filler bits into radio frames; and
   a multiplexer for multiplexing the radio frames into a serial data frame,
   wherein the number of filler bits is determined such that the filler bit inserted data frames can be segmented into equally sized radio frames.

15. A channel coding and multiplexing method for a CDMA communication system in which data frames that have one or more transmission time intervals (TTIs) are received in parallel via a plurality of transport channels and multiplexed into a serial data frame, the method comprising:
   receiving data frames;
   determining a number of filler bits;
   inserting the number filler bits into the data frames;
   segmenting the data frames including the filler bits into radio frames in a number of radio frame matchers; and
   multiplexing the radio frames into the serial data frame,
   wherein the number of filler bits is determined such that the filler bit inserted data frames can be segmented into equally sized radio frames.

16. A channel coding and multiplexing method for a CDMA communication system, in which data frames that have one or more transmission time intervals (TTIs) are received in parallel via a plurality of transport channels and converted to data frames of multi-code physical channels, the method comprising:
   segmenting the received data frames into radio frames in a number of radio frame matchers;
   multiplexing the radio frames into a serial data frame; and
   segmenting the serial data frame by the number of the physical channels and outputting the segmented physical channel frames to corresponding physical channels,
   wherein the segmented physical channel frames for physical channel #1 are output as $e_{1j}=d_j$, the segmented physical channel frames for physical channel #2 are output as $e_{2j}=d_{(j+P/M)}$ and the segmented physical channel frames for physical channel #M are output as $e_{Mj}=d_{d(j+(M-1)P/M)}$, and wherein the bits of the serial data frame output from the multiplexer are $d_1$, $d_2, \ldots, d_p$, the number o physical channels is M, the size of the serial data frame output from the multiplexing step is P and $j=1,2, \ldots, P/M$.

17. The channel coding and multiplexing apparatus of claim 7, wherein one filler bit is added to the end of each radio frame having frame time index $t>=T_i-r_i+1$ where $r_i$ indicates the number of filler bits and $T_i$ indicates a TTI.

18. The channel coding and multiplexing apparatus of claim 11, wherein one filler bit is added to the end of each radio frame having frame time index $t >= T_i - r_i + 1$ where $r_i$ indicates the number of filler bits and $T_i$ indicates a TTI.

19. The channel coding and multiplexing apparatus of claim 12, wherein one filler bit is added to the end of each radio frame having frame time index $t >= T_i - r_i + 1$ where $r_i$ indicates the number of filler bits and $T_i$ indicates a TTI.

20. The channel coding and multiplexing apparatus of claim 14, wherein one filler bit is added to the end of each radio frame having frame time index $t >= T_i - r_i + 1$ where $r_i$ indicates the number of filler bits and $T_i$ indicates a TTI.

21. The channel coding and multiplexing apparatus of claim 15, wherein one filler bit is added to the end of each radio frame having frame time index $t >= T_i - r_i + 1$ where $r_i$ indicates the number of filler bits and $T_i$ indicates a TTI.

* * * * *